United States Patent [11] 3,609,409

[72] Inventor Richard L. Best
Wayland, Mass.
[21] Appl. No. 478,545
[22] Filed Aug. 10, 1965
[45] Patented Sept. 28, 1971
[73] Assignee Digital Equipment Corporation
Maynard, Mass.

[54] DATA TRANSMISSION CIRCUIT
11 Claims, 1 Drawing Fig.

[52] U.S. Cl. .......... 307/275, 307/208, 307/218, 307/243
[51] Int. Cl. .......... H03k 3/30, H03k 19/22
[50] Field of Search .......... 307/275, 218, 208, 241, 243, 253, 254, 275

[56] References Cited
UNITED STATES PATENTS

| | | | |
|---|---|---|---|
| 3,099,712 | 7/1963 | Meacham .......... | 307/275 |
| 3,144,581 | 8/1964 | Greenburg .......... | 307/275 |
| 2,966,597 | 12/1960 | Bonn et al. .......... | 307/253 |
| 2,999,172 | 9/1961 | Lawrence .......... | 307/275 |

*Primary Examiner*—Donald D. Forrer
*Assistant Examiner*—David M. Carter
*Attorney*—Cesari & McKenna

ABSTRACT: A data transmission circuit for transmitting pulses from a data unit over a buss includes a regenerative pulse amplifier that responds to gated pulses from the data unit by applying pulses of predetermined amplitude and shape to the buss. The amplifier includes a PN junction in series with its connection to the buss, with this junction being reverse biased in the absence of a pulse from the amplifier so as to present a high impedance to the buss. Regeneration is accomplished by means of an autotransformer which simplifies the amplifier circuit.

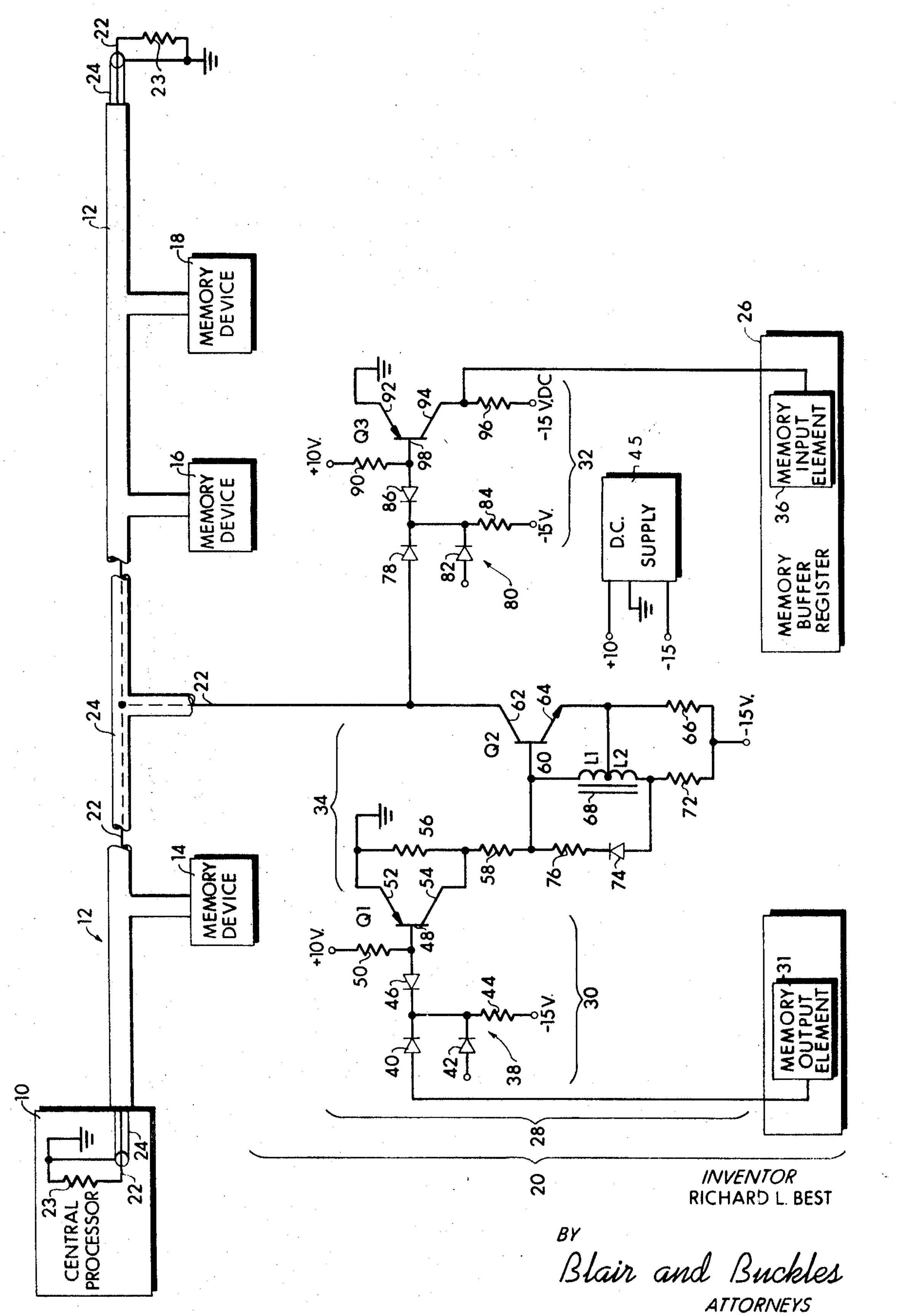
INVENTOR
RICHARD L. BEST
BY
*Blair and Buckles*
ATTORNEYS

DATA TRANSMISSION CIRCUIT

This invention relates to a data transmission circuit for connection between a data signal source and apparatus for processing the data signal. More particularly, the invention provides a transmission circuit for developing a pulse of standard width and, when quiescent, for isolating the terminal at which the pulse is developed from the remainder of the transmission circuit.

In one present day data-processing system, a buss of data conductors connects a central processor with several memory devices. Each conductor in the buss carries digital signals from the central processor for application to each memory device, only one of which is active at a time to accept the signals. Alternatively, the memory devices can be activated one at a time to apply digital signals to the data conductors for transmission to the central processor.

In the prior art, the connection between each such data conductor and each memory device has been made with a conventional pulse amplifier or gate circuit.

However, the low-cost conventional circuits do not present sufficiently high output impedance to the data conductor when the circuits are quiescent and at the same time apply uniform pulses to the data conductors when activated. More particularly, the memory devices developing the pulses to be applied to the data conductors generally develop nonuniform pulses of relatively short and varying widths. However, it is advantageous and often almost imperative that the processor receive uniform signals, in some instances preferably of a longer pulse width than the initial pulse. For one thing, working with such uniform data signals facilitates the elimination of erroneous responses, i.e. the false registration of data signals.

Moreover, ad indicated above, each data conductor is connected to many memory devices, normally only one of which is active at a time to transfer data on the conductor. Operation with this arrangement is efficient only when the transmission circuit in each inactive memory device presents a high impedance to the data conductor. Otherwise, a substantial portion of the energy in each signal is dissipated in the inactive devices connected to the data conductors and thus is wasted.

Heretofore, a transmission circuit with the desired characteristics has been relatively costly. However, inasmuch as large data processing systems make use of a great many such circuits, even a small saving in the cost of an acceptable data transmission circuit results in a considerable reduction in the cost of the overall system.

Accordingly, it is an object of the present invention to provide an improved digital data transmission circuit.

Another object of the invention is to provide a relatively low-cost data transmission circuit developing substantially uniform output pulses in response to different input signals.

Another object of the invention is to provide such a data transmission circuit having a relatively high output impedance when inactive.

It is also an object of the invention to provide a digital data transmission circuit for connection between a two-way data conductor and a data register and which presents minimal loading to the data conductor when inactive and operates to apply relatively uniform pulses to the data conductor when activated.

The objects of the invention also include providing circuits of the above character at low cost and having low operating power consumption.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, which is a schematic representation of a data-processing system incorporating a data transmission circuit embodying the invention.

According to the present invention, a data transmission circuit highly suited for the application discussed above employs a single-stage regenerative pulse amplifier. When the amplifier is gated ON, a regenerative action maintains it ON at a level of conduction and for a duration both of which are essentially independent of the input signal. The circuit accordingly develops a relatively uniform output pulse in response to a variety of input signals.

The amplifier is further arranged with a reverse-biased PN junction at its output terminal, so that the quiescent output impedance of the circuit is relatively high.

As shown in the drawing, a data-processing system in which the transmission circuit has particularly advantageous use includes a central processor 10 that can, for example, be the arithmetic element of a digital computing system. A memory buss indicated generally at 12 connects the processor with memory devices 14, 16 and 18 and with a further memory device indicated generally at 20.

Aside from the transmission circuit, the memory devices 14, 16, 18 and 20 can employ any one of a number of conventional constructions and can, for example, include core memories each of which conventionally has (not shown) a memory address register, a memory buffer register, an array of magnetic cores and associated control equipment.

The memory buss 12 typically comprises a number of conductors, including conductors for control and instruction signals and conductors for data. By way of example, in a computing system operating with data words of 36 binary digits, the buss 12 will have 36 data conductors. Typical of these conductors in the buss is a conductor 22 having a shield 24 much the same as a transmission line. At the left side of the drawing, in the central processor 10, the data conductor 22 is conventionally connected with a buffer register (not shown). In any case, the conductor 22 is terminated there by a resistance 23. A similar termination is provided at the other end of the buss 12, as shown at the right side of the drawing. The resistive terminations preferably match the characteristic impedance of the transmission line containing the conductor 22 and thus prevent reflections from the ends thereof.

As shown in the memory device 20, a data transmission circuit indicated generally at 28 connects the data conductor 22 to a memory output element 31 and to a memory input element 36. The memory output element 31 is appropriately the output from a magnetic core sense amplifier (not shown) and the input element 36 is appropriately a stage of a memory buffer register 26. The data transmission circuit 28 has a readout gating stage, indicated generally at 30, connected between the memory output element 31 and a pulse amplifier indicated generally at 34. The amplifier 34, in turn, is connected to the data conductor 22.

In addition, a read-in gating stage 32 is connected between the data conductor 22 and the memory input element 36.

The readout gating stage 30 includes a two-diode AND circuit 38 having a diode 40 connected to receive a data signal from the memory output element 31. A diode 42 in the AND circuit 38 is connected in a conventional manner (not shown) to receive a readout pulse from either the central processor 10 or from within the memory device 20. The cathode terminals of the diodes 40 and 42 are connected together and through a resistor 44 to a source of negative potential, illustrated as a minus 15-volt terminal of a supply 45. The cathodes of the diodes 40 and 42 are also connected through a biasing diode 46 to the base 48 of a transistor Q1. A resistor 50 is connected between the transistor base and a positive terminal of the supply 45.

The emitter 52 of the transistor Q1 is connected to ground. A resistor 56 is between the transistor collector 54 and ground, and a resistor 58 couples the collector to the base 60 of a pulse-amplifying transistor Q2.

The collector 62 of the transistor Q2 is connected to the data conductor 22 and the emitter 64 is connected through a series resistor 66 to the negative power supply terminal. Also in the pulse amplifier stage 34, an autotransformer 68 has a first section L1 connected between the transistor base 60 and emitter 64. A second section L2 of the inductor 68 is in series with the section L1 and a resistor 72 connected to the negative power supply terminal. As described below, to prevent ringing in the autotransformer 68, the series combination of a diode 74 and a resistor 76 is connected across it.

The illustrated construction of the read-in gating stage 32 has a diode 78 connected to the data conductor 22 and forming with a diode 82 an AND circuit indicated generally at 80. The input signal to the diode 82 is a read-in control signal developed in a conventional manner according to the specific design of the data-processing system. The cathode terminals of the diodes 78 and 82 are connected through a resistor 84 to the negative terminal of the supply 45.

As in the gating circuit 30, the read-in gating circuit 32 has a biasing diode 86 connected between the output of the AND circuit 80 and the base 98 of a transistor Q3. A resistor 90 is connected between the positive terminal of the supply 45 and the transistor base 98. The emitter 92 of the transistor Q3 is connected to ground and the collector 94 is connected through a current-limiting resistor 96 to the negative supply terminal and also to the input element 36 of the buffer register 26.

The illustrated transfer circuit 28 and read-in gating circuit 32 are described, by way of example, for operation with binary signals substantially at zero volts and alternatively at minus three volts. When the readout gating stage 30 is quiescent, at least one of the diodes 40 and 42 in the AND circuit 38 receives a ground level or zero-volt signal. The diode conducts and maintains the AND circuit output signal, applied to the diode 46, essentially at zero volts. The biasing diode 46 is forward biased and, due to its forward resistance, maintains a small positive voltage at the base 48 of the transistor Q1. Inasmuch as the transistor emitter 52 is grounded, in this condition the transistor is in the nonconducting state.

In the pulse amplifier 34, each section L1 and L2 of the autotransformer 68 has a relatively small resistance and hence in the quiescent condition the transistor Q2, emitter 64 and base 60 are very nearly at the same potential. Hence, the transistor Q2 is normally in the nonconducting state. The resistance of the series-connected resistors 56 and 58 is sufficiently larger than that of the parallel-connected resistors 66 and 72 to maintain the transistor Q2 base 60 very near the potential of the negative supply terminal.

When the memory device 20 is carrying out a memory operation with the central processor 10 and the diode 40 receives a negative data signal at the same time that the diode 42 receives a negative readout control signal, the output of the AND circuit 38 also goes negative. The resulting negative potential at the transistor base 48 turns ON the transistor Q1, causing the potential at the collector 54 to rise substantially to ground.

The resistor 58 couples this voltage to the base 60 of the transistor Q2. Due to the time lag through the transformer section L1, the voltage at the transistor emitter 64 rises more slowly than the base voltage and hence the Q2 emitter base junction is forward biased, turning the transistor on.

The potential at the emitter 64 then rises and this voltage change is applied to the autotransformer section L2. In turn, it is coupled to the section L1 by the autotransformer 68, with an increase in magnitude provided by a corresponding L1—L2 turns ratio if desired.

The voltage thus induced in the section L1 is in the nature of regenerative feedback. It increases the base emitter current in transistor Q2 and with the amplification provided by this transistor, the regenerative action continues so that the transistor is quickly driven fully ON, i.e. is saturated.

When the current in the transistor Q2 stops increasing, the time of which depends on the resonance characteristics of the transformer 68, the collapsing flux linking the inductor sections L1 and L2 drives the transistor base 60 negative with respect to the emitter 64, thereby switching the transistor Q2 OFF, i.e. nonconducting. As the reverse voltage across the autotransformer 68 produced by the collapsing field increases, the diode 74 becomes forward-biased and conducts, applying the relatively low resistance of the resistor 76 in shunt with the autotransformer 68. This prevents the autotransformer from ringing or oscillating; such oscillations might turn the transistor Q2 ON again.

Turning now to the voltage at the collector 62 of transistor Q2, the central processor 10 normally maintains it at ground. Hence, when the transistor Q2 is not conducting, the collector-base junction is reverse biased by slightly less than the voltage at the negative supply terminal.

When the transistor Q2 conducts, the collector is driven negative from its normal ground level to around minus three volts. Since the transistor Q2 is driven to saturation, this voltage is determined primarily by the values of the data conductor terminating resistors 23 and by the parallel resistors 66 and 72. The collector remains at the depressed voltage until transistor conduction ceases, when the central processor circuit returns it to ground potential.

Thus, the pulse amplifier 34 converts a positive-going input voltage at its base 60 to a negative pulse whose width and amplitude are primarily dependent on the characteristics of the transformer 68, rather than on the input signal. It is in this manner that the coincidence of two negative-going input signals of fairly arbitrary waveform at the AND circuit 38 (in the readout gating stage 30) produces a relatively predetermined negative pulse on the data conductor 22 for transmission to the central processor 10.

The read-in gating stage 32, being substantially identical to the readout stage 30, has the same quiescent operation. That is, when at least one of the AND circuit diodes 78 and 82 has a zero-volt input signal, the transistor Q3 has a slightly positive voltage at its base 98 and is hence nonconducting. The coincidence of a negative data signal on the data conductor 22 and a negative read-in control signal to the diode 82, however, produces a negative voltage at the cathode of the diode 86 and causes the transistor Q3 to conduct. The voltage of the transistor collector 94 accordingly rises and the resultant positive-going pulse is applied to the buffer register input element 36.

It will be noted that when the readout gating stage 30 and the pulse amplifier 34 apply a data pulse to the conductor 22, the pulse is also applied to the diode 78 of the read-in gating stage 32. This is desired where the memory device 20 has destructive readout so that a word read from the memory array thereof is no longer stored in the memory after the readout operation. More particularly, as each digit of a word is read out of the memory, the present transmission circuit applies it to the read-in stage 32. Thus, the digit can be immediately written back in the same memory address.

It will also be noted that the pulse-amplifying section 34 of the data transfer circuit 28 requires only a single active element, i.e. the transistor Q2 and minimal additional circuit elements. Hence the circuit can be constructed at remarkably low cost. Accordingly, data-processing equipment incorporating the transfer circuit of the invention will have superior operating characteristics and yet be low in cost.

As noted above, when the transistor Q2 is not conducting, its base 60 is highly negative and the collector base junction is reverse biased. The reverse bias exceeds the negative voltage of pulses the processor 10 and, alternatively, the transmission circuits in the other memory devices 14, 16 and 18 apply to the data conductor 22. Hence, the transmission circuit 28 presents a high resistance to the data conductor except when it is active.

In the read-in gating circuit 32, in the absence of an enabling signal at the diode 82, the anode of the diode 78 is at ground potential and hence the diode presents a large resistance to negative pulses passing on the conductor 22 between the processor 10 and the other memory devices 14, 16 and 18.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. In a digital data transfer circuit having a operable device operable to emit digital signals and a second device operable to receive digital signals, a data transmission circuit connected between said first and second device, said data transmission circuit comprising A. means forming an input terminal connected with said first device for receiving said digital signal,
B. means forming an output terminal connected with said second device,
C. means connecting said input and output terminals to at least one other device in a data-processing system including said transfer circuit,
D. conductor means forming a common return,
E. a semiconductor switching device
  1. having first, second and third terminals,
  2. arranged to provide
    a. a low impedance between said first and second terminals when said third terminal receives a signal having a first predetermined polarity with respect to said first terminal,
    b. a high impedance between said first and second terminals in the absence of such a signal,
    c. a high resistance to current in one direction between said second and third terminals,
  3. said third terminal being in circuit with said input terminal to receive a signal having said first polarity when said first device emits a digital signal,
  4. said first and third terminals being connected between said output terminal and said common return conductor,
F. a first inductive element connected between said first and third terminals,
G. a second inductive element
  1. connected between said first terminal and said common return conductor,
  2. inductively coupled with said first inductive element, and
  3. providing regenerative feedback from between said first terminal and said common return conductor through said first inductive element to between said first and third terminals.

2. Apparatus according to claim 1 further comprising unidirectional circuit means for conducting current in only one direction, said unidirectional means being arranged to apply a low impedance across said first inductive element when the voltage between said first and third terminals of said switching device is opposite to said first polarity.

3. In a data-processing system containing a plurality of units between which data is transferred, a data transmission circuit for transmitting such data, said data transmission circuit having A. a first conductor connected to one of said units,
B. a second conductor for receiving digital signals from another of said units,
C. a common return conductor,
D. a date circuit having an input terminal connected to said second conductor and having an output terminal,
E. a semiconductor switching device
  1. having first, second and third terminals and first and second PN junctions in series between said first and second terminals and conducting forward current in opposite directions,
  2. said third terminal being connected to each junction on the side thereof opposite the side connected with said first and second terminals,
  3. said switching device conducting current between said first and second terminals only when said second junction between said first and third terminals is forward biased,
  4. said third terminal being connected with said gate circuit output terminal,
  5. said second terminal being in circuit with said first conductor,
  6. said first terminal being in circuit with said common return circuit,
F. a first inductive element connected between said first and third terminals,
G. a second inductive element
  1. connected between said first terminal and said return conductor,
  2. inductively coupled with said first element, and
  3. applying a voltage change across said first element corresponding to changes in the voltage between said first terminal and said return conductor,
H. whereby said switching device applies a predetermined voltage to said first conductor for a predetermined interval in response to a pulse from said gate circuit and presents a high impedance to said gate circuit in the absence of such a pulse.

4. A data transmission circuit according to claim 3 further comprising a unidirectional damping circuit in parallel with said first inductive element and conducting current only when said second junction is reverse biased.

5. A data transmission circuit according to claim 3 further comprising

A. a first resistor in series with said second inductive element between said first terminal of said switching device and said return conductor, and
B. a second resistor between said first terminal of said switching device and said return circuit to be in parallel with said second inductive element and said first resistor.

6. A data transmission circuit according to claim 3 in which said gating circuit includes means that normally maintains said third terminal at a voltage relative to said first and second terminals to reverse bias said first and second junctions of said switching device, said gating circuit changing the voltage at said third terminal to forward bias said second junction when it receives said first digital signal on said second conductor.

7. A digital data transmission circuit comprising in combination

A. a common return conductor,
B. a gate circuit having input and output terminals and changing the resistance between its output terminal and said return conductor from a normally present first value to a second value when it receives a first digital signal,
C. a regenerative amplifier circuit
  1. having transistor means with a base, an emitter and a collector,
  2. said base being in circuit with said output terminal,
  3. having a first resistor between said emitter and said return conductor,
  4. having autotransformer means with a first inductive element between said base and said emitter and with a second inductive element in parallel with said first resistor,
  5. having a direct current supply in series with said emitter, said collector and said return conductor, and, when said first resistance is present, biasing said transistor through said first resistor and said gate circuit resistance to be nonconducting, with the base collector junction being reverse biased.

8. A digital data transmission circuit according to claim 7 further comprising a second resistor in series with said second inductive element to be in parallel with said first resistor.

9. A digital data transmission circuit according to claim 7 further comprising an electrical damping circuit shunting said first inductive element with a relatively low impedance when the transistor base emitter junction is reverse biased.

10. A data transmission circuit comprising in combination

A. a common return circuit,

B. a first transistor having a base, a collector and an emitter and being arranged to be normally nonconducting, C. an inductor 1. having end terminals and a tap intermediate said end terminals,
2. said tap being connected to said first transistor emitter,
3. having one end terminal connected to said first transistor base, D. a first resistor in series between the other end terminal of said inductor and said return circuit, E. the series combination of a resistor and a diode connected between the end terminals of said inductor with the diode arranged to be reverse biased when said first transistor base is positive with respect to the emitter thereof, F. a second resistor connected between said return circuit and said inductor tap, G. a second transistor having a base, a collector and an emitter and being arranged normally nonconducting with said emitter thereof connected to said return circuit, H. a third resistor connected between the collector and emitter of said second transistor, I. a fourth resistor connected between the collector of said second transistor and the base of said first transistor, and J. the base of said first transistor being so arranged that in response to a signal having a selected voltage characteristic, said first transistor conducts and the resultant decrease in resistance between said collector and emitter of said first transistor produce a change in the voltage at the base of said second transistor causing said second transistor to conduct.

11. A digital transmission circuit according to claim 9 further comprising a gating circuit having a data input conductor connected to the collector of said second transistor.